J. NELLIS.
Shaft-Support.

No. 159,204.

Patented Jan. 26, 1875.

WITNESSES.
P. C. Dieterich
F. Knecken

INVENTOR.
James Nellis
per. T. H. Alexander
ATTORNEY.

UNITED STATES PATENT OFFICE.

JAMES NELLIS, OF YPSILANTI, MICHIGAN, ASSIGNOR TO HIMSELF AND CHARLES McINTOSH, OF SAME PLACE.

IMPROVEMENT IN SHAFT-SUPPORTS.

Specification forming part of Letters Patent No. 159,204, dated January 26, 1875; application filed December 8, 1874.

*To all whom it may concern:*

Be it known that I, JAMES NELLIS, of Ypsilanti, in the county of Washtenaw and State of Michigan, have invented certain new and useful Improvements in Shaft-Supports; and I do hereby declare that the following is a full, clear, and exact description thereof, reference being had to the accompanying drawings and to the letters of reference marked thereon, which form part of this specification.

My invention relates to shafts for vehicles, and has for its object to support the shafts at any desired altitude when the vehicle is not in use; and to this end the nature of my invention consists in a strap attached to the cross-bar of the shafts, and connected by hook and eye, or other suitable device, with the spring-bar of the vehicle. It also consists in a loop, attached to the cross-bar of the shafts, for holding and protecting the hook or other connecting device, when the strap is not in use, as will be hereinafter more fully set forth.

In order to enable others skilled in the art to which my invention appertains to make and use the same, I will now proceed to describe its construction and operation, referring to the annexed drawing, in which—

Figure 1:
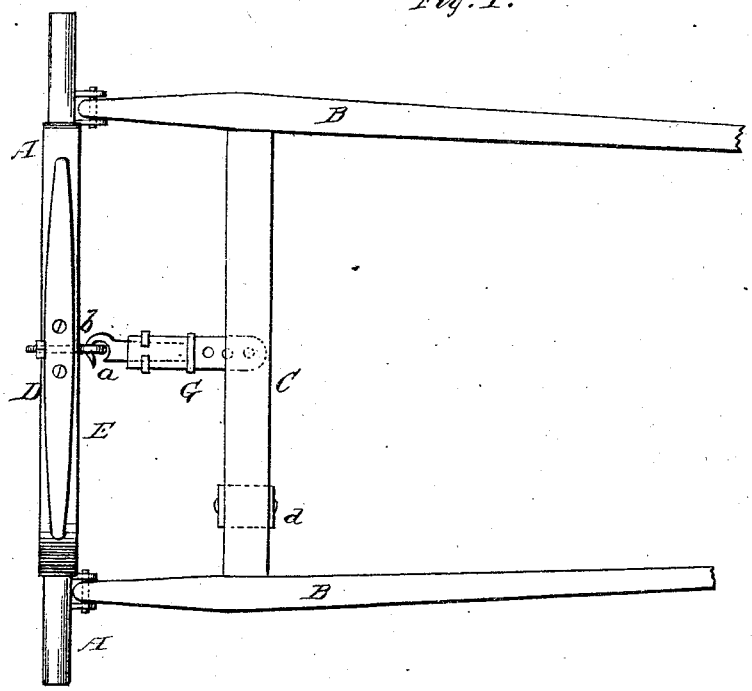
Figure 2:
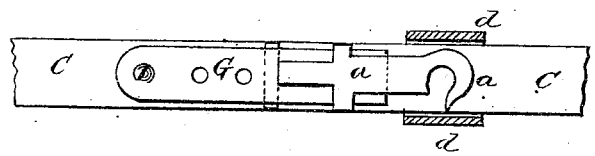

Figure 1 is a plan view, and Fig. 2 is a detail enlarged view, of my invention.

A represents the front axle of a vehicle, to which the shafts B B are attached in any of the known and usual ways. C is the ordinary cross-bar, connecting the shafts B B. E is the front spring, and D is the spring-bar fastened on top thereof. G is a strap, chain, or other suitable device attached to the cross-bar C, in such a manner that it can be extended along said cross-bar when not in use, and when desired for use it may be turned to connect with the spring-bar D by means of a hook, a, and eye b, or otherwise, as deemed most convenient, for the purpose of supporting the shafts at any desired angle, to get them out of the way. The device G may be taken up so as to be short enough to stand the shafts almost straight up. On the cross-bar C is secured a loop, d, to hold the hook or connection a, so as to prevent its falling or getting loose when the device G is not in use, and also to cover it so that the horse cannot get his tail caught in it to break the hair.

The device G may, of course, be permanently attached to the spring-bar instead of to the cross-bar. The loop d should then also be attached to the spring-bar.

Having thus fully described my invention, what I claim as new, and desire to secure by Letters Patent, is—

1. The combination, with the spring-bar D and cross-bar C, of the strap G, hook a, and eye b, for the purposes set forth.

2. The loop d, attached to the cross-bar C, in combination with the strap G and hook a, for the purposes set forth.

In testimony that I claim the foregoing as my own I affix my signature in presence of two witnesses.

JAMES NELLIS.

Witnesses:
J. WILLARD BABBITT,
ORSON W. CODY.